(12) United States Patent
Ferguson

(10) Patent No.: US 10,941,933 B2
(45) Date of Patent: *Mar. 9, 2021

(54) VISION ENHANCING LIGHT CLIP

(71) Applicant: RIVERPOINT MEDICAL, LLC, Portland, OR (US)

(72) Inventor: John Thomas Ferguson, Portland, OR (US)

(73) Assignee: RIVERPOINT MEDICAL, LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/585,425

(22) Filed: Sep. 27, 2019

(65) Prior Publication Data

US 2020/0025365 A1 Jan. 23, 2020

Related U.S. Application Data

(63) Continuation of application No. PCT/US2017/051114, filed on Sep. 12, 2017, which
(Continued)

(51) Int. Cl.
| | | |
|---|---|---|
| *F21V 33/00* | (2006.01) | |
| *F21V 17/02* | (2006.01) | |
| *F21V 21/088* | (2006.01) | |
| *F21V 21/096* | (2006.01) | |
| *F21L 4/00* | (2006.01) | |

(Continued)

(52) U.S. Cl.
CPC ............ *F21V 33/0008* (2013.01); *F21L 4/00* (2013.01); *F21V 17/02* (2013.01); *F21V 21/088* (2013.01); *F21V 21/0885* (2013.01); *F21V 21/096* (2013.01); *F21V 21/26* (2013.01);
(Continued)

(58) Field of Classification Search
CPC .... F21V 21/0885; F21V 21/26; F21V 21/088; F21V 21/096; F21V 21/084; F21V 33/0008; F21V 17/02; F21L 4/00
See application file for complete search history.

(56) References Cited

U.S. PATENT DOCUMENTS

| | | |
|---|---|---|
| 3,008,040 A | 11/1961 | Moore |
| 4,916,579 A | 4/1990 | Simms |

(Continued)

OTHER PUBLICATIONS

International Search Report and Written Opinion of related international application PCT/US17/51114 dated Oct. 27, 2017.
(Continued)

*Primary Examiner* — Bryon T Gyllstrom
*Assistant Examiner* — James M Endo
(74) *Attorney, Agent, or Firm* — Timothy E. Siegel Patent Law, PLLC; Timothy E. Siegel

(57) ABSTRACT

A lighting device, for attachment to an object structured to be worn on at least one facial feature of a human user, having a releasable fastener adapted for attachment to the above-noted object and a pole, having a first end pivotably connected to the releasable fastener, and a second end, opposed to the first end. An electric lamp is pivotably connected to the second end. Further, the pole defines an internal cavity and has battery contacts positioned to contact a battery set placed in the internal cavity. A conductive assembly is electrically connected between the battery contacts and the electric lamp, so as to power the electric lamp.

20 Claims, 1 Drawing Sheet

Related U.S. Application Data is a continuation of application No. 15/470,551, filed on Mar. 27, 2017, now Pat. No. 9,772,102.

(51) Int. Cl.
  *G02C 11/04* (2006.01)
  *F21V 21/26* (2006.01)
  *F21Y 115/10* (2016.01)
  *F21W 131/30* (2006.01)

(52) U.S. Cl.
  CPC ......... *G02C 11/04* (2013.01); *F21W 2131/30* (2013.01); *F21Y 2115/10* (2016.08); *G02C 2200/02* (2013.01)

(56) References Cited

U.S. PATENT DOCUMENTS

| | | | |
|---|---|---|---|
| 6,736,529 B1 * | 5/2004 | Lee | B62J 6/02 362/287 |
| 9,091,428 B2 | 7/2015 | Ferguson | |
| 9,234,653 B2 | 1/2016 | Ferguson | |
| 9,351,799 B2 | 5/2016 | Ferguson | |
| 9,568,177 B2 | 2/2017 | Ferguson | |
| 9,772,102 B1 | 9/2017 | Ferguson | |
| 2003/0021105 A1 * | 1/2003 | Cramer | F21V 21/084 362/105 |
| 2008/0205036 A1 * | 8/2008 | Tarter | F21L 4/04 362/105 |
| 2008/0285259 A1 | 11/2008 | Uke | |
| 2008/0316734 A1 * | 12/2008 | Spartano | F21V 21/084 362/105 |
| 2010/0177502 A1 * | 7/2010 | Lau | F21V 21/084 362/105 |
| 2012/0120636 A1 * | 5/2012 | Wilt | A61B 90/11 362/105 |
| 2012/0195025 A1 | 8/2012 | Gerolemou | |
| 2014/0334132 A1 | 11/2014 | Ferguson | |
| 2014/0334159 A1 | 11/2014 | Ferguson | |
| 2016/0123563 A1 | 5/2016 | Ferguson | |
| 2016/0207228 A1 | 7/2016 | Ferguson | |

OTHER PUBLICATIONS

Examination report of related Australian application 2017272150 dated Apr. 18, 2018.
Examination report of related Australian application 2017272150 dated Jun. 22, 2018.

* cited by examiner

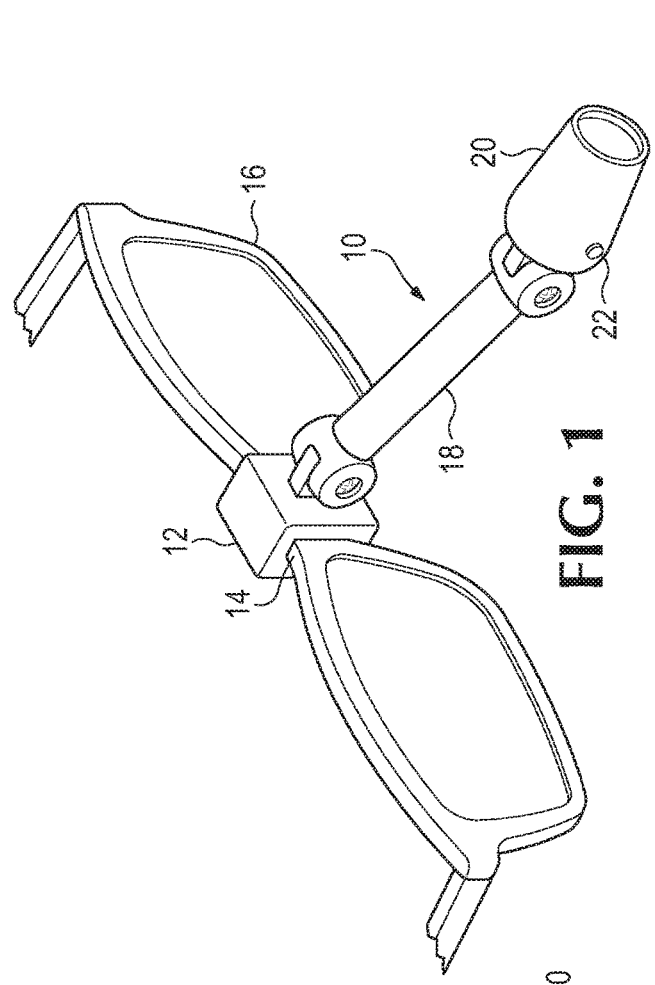
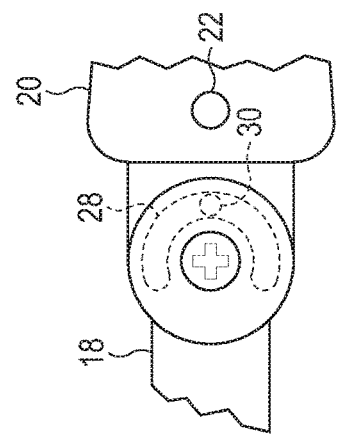
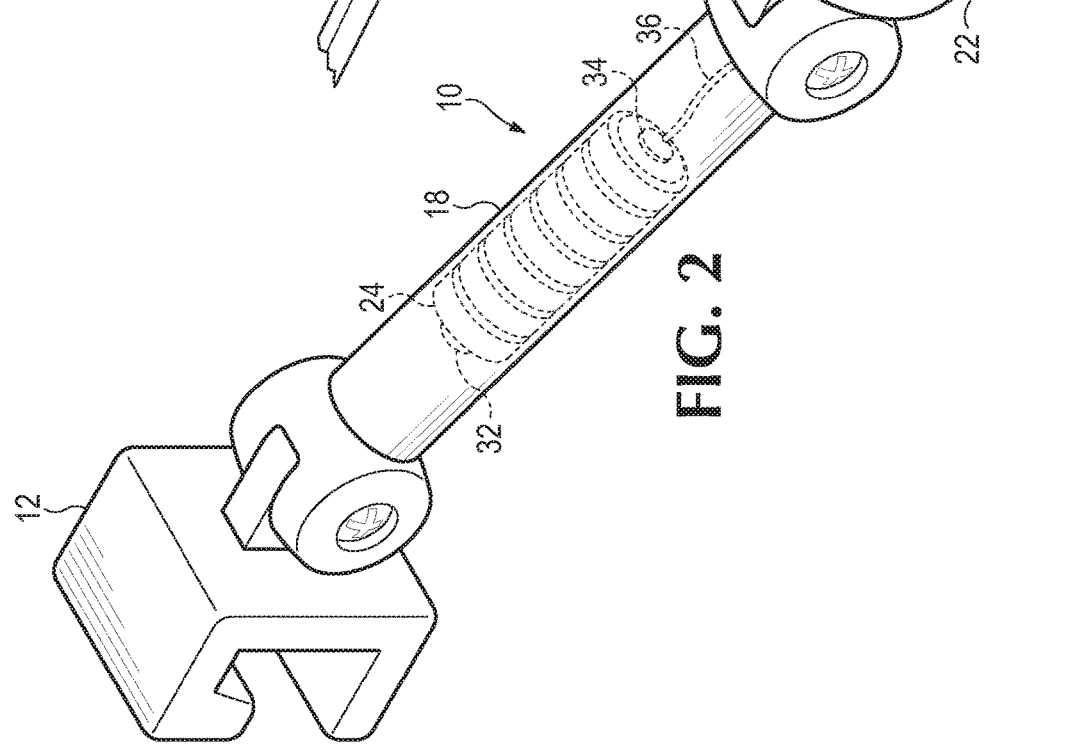

VISION ENHANCING LIGHT CLIP

RELATED APPLICATIONS

This application is a continuation of International Application Serial No. PCT/US17/51114, filed Sep. 12, 2017, which itself is a continuation of U.S. application Ser. No. 15/470,551, filed Mar. 27, 2017, now U.S. Pat. No. 9,772,102, issued on Sep. 26, 2017, both of which are incorporated by reference as if fully set forth herein.

BACKGROUND

For a medical professional examining or performing surgery on a patient, being able to clearly see the area of interest is critical. For this purpose, many different illumination devices and vision enhancing devices are available. Illumination devices include many different types of medical headlamps, some powered by a battery pack worn at the waist, while others are powered by a battery pack worn on the headband of the headlamp. One example of a headlamp is disclosed in U.S. Pat. No. 3,008,040 (Moore). Moore references a headlamp having a self-contained source of electrical energy in the form of rechargeable "button" cells and to a recharger unit for use with same.

For vision enhancement, there are eyeglasses that not only correct vision but that also magnify the area of interest. Although efforts have been made to twin eyeglasses with a light source, these devices tend to be somewhat cumbersome and expensive, with battery placement a challenging issue in design.

Although it is known to clip a flashlight to a pair of eyeglasses, the result has been suboptimal. Ideally, the light source should be positioned directly between the user's eyes, and projects light straight ahead from this position. But because the bridge of a pair of eyeglasses is generally above eye level, a simple flashlight attached to this bridge if pointed down so that the front of the flashlight is at eyelevel, will project a beam of light downwardly. Generally, and particularly in a medical setting, this is undesirable because the further a light source is from the user's interpupil region, the larger shadows it creates, thereby failing to adequately light the region of interest.

SUMMARY

The following embodiments and aspects thereof are described and illustrated in conjunction with systems, tools and methods which are meant to be exemplary and illustrative, not limiting in scope. In various embodiments, one or more of the above described problems have been reduced or eliminated, while other embodiments are directed to other improvements.

In a first, separate embodiment, the present invention is a lighting device, for attachment to an object structured to be worn on at least one facial feature of a human user, having a releasable fastener adapted for attachment to the above-noted object and a pole, having a first end pivotably connected to the releasable fastener, and a second end, opposed to the first end. An electric lamp is pivotably connected to the second end. Further, the pole defines an internal cavity and has battery contacts positioned to contact a battery set placed in the internal cavity. A conductive assembly is electrically connected between the battery contacts and the electric lamp, so as to power the electric lamp.

In a second, separate embodiment, the present invention is a method of providing light to an area in front of the eyes of a human user, utilizing an object structured to be worn on at least one facial feature of said human user and a light device that includes a releasable fastener and a pole, having a first end pivotably connected to the releasable fastener, and a second end, opposed to the first end, and containing a battery set; an electric lamp, pivotably connected to the second end; and a conductive assembly, electrically connected between the battery set and the electric lamp, so as to power the electric lamp. The method includes clipping the releasably fastening light device to the object and placing the object on the face of the user; and using the lamp to provide light to the area in front of the eyes of the user.

In a third, separate embodiment, the present invention is an assembly for assisting the vision of a user and including an object structured to be worn on at least one feature of the face of a human user; and a light device attached to this object, and further including a pole, having a first end pivotably connected to the bridge, and a second end, opposed to the first end and containing a battery set. Further an electric lamp is pivotably connected to the second end and a conductive assembly is electrically connected between the battery set and the electric lamp, so as to power the electric lamp.

BRIEF DESCRIPTION OF THE DRAWINGS

Exemplary embodiments are illustrated in referenced drawings. It is intended that the embodiments and figures disclosed herein are to be considered illustrative rather than restrictive.

FIG. 1 is an isometric view of a light releasable fastener, according to the present invention, clipped to a pair of eyeglasses.

FIG. 2 is an isometric view of the light releasable fastener of FIG. 1, showing some hidden elements with dashed lines.

FIG. 3 is a detail view of a portion of the light releasable fastener, showing some further hidden elements with dashed lines.

DETAILED DESCRIPTION OF THE PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In the context of this application, a "set" may include multiple elements or a single element.

Referring to FIGS. 1 and 2, in a preferred embodiment of the present invention, a vision enhancing assembly 10, includes a releasable fastener 12, adapted to permit attachment to a bridge 14 of a pair of eyeglasses 16. A pole 18 is hinged (pivotably attached in one plane of movement) at a first end to releasable fastener 12. In turn, a lamp 20 (which may also be referred to as a bezel) is hinged to second end of pole 18, which is opposed to the first end. Pole 18 holds a battery set 24, which is electrically connected by way of battery contacts 32 and 34, and a conductive assembly 36 to lamp 20, so as to power lamp 20. In one embodiment, an actuator 22 is available to activate lamp 20, and adjust light intensity, is present on the lamp 20. A return conductive assembly (not shown) is connected between lamp 20 and battery contact 32, in accordance with well-known principles of electrical lighting design.

In one embodiment, conductive assembly 36 may include a pair of wires passing between pole 18 and lamp 20, to conduct electricity to lamp 20 and back to battery set 24. Alternatively, pole 18 or lamp 20 may include a socket that accepts a mating jack from lamp 20 or pole 18, respectively. Referring to FIG. 3, in another embodiment, a contact 30 on a first portion of the hinge between pole 18 and lamp 20, makes contact with a facing arcuate contact 28 on an adjacent portion of that hinge. As the hinge is rotated, electrical connection is maintained.

In one embodiment battery set 24 is a stack of cell batteries, of the type commonly used to power watches and other articles where space is at a premium, and having a diameter of between 8 mm and 14 mm, depending on the exact type of cell battery. In one embodiment, more specifically, ANSI 1166A(L) batteries are used. In an additional embodiment, a AAA battery is used. In one embodiment batteries 24 are rechargeable, with, for example, the socket for connecting to the jack from the lamp also serving as a recharging port. In an additional embodiment pole 18 opens to permit replacement of batteries. In yet another embodiment, pole 18 is produced integrally with the battery set, and is made for a single use only. In one variant of this embodiment the hinges are made to snap apart (or otherwise come apart), to permit easy replacement of pole 18. In a further embodiment, assembly 10 further includes a set of alternative lamps 20, to provide differing light intensities, colors and other varying light characteristics, per user choice. This is particularly efficient in the embodiment in which the lamp 20 snaps off pole 18. Lamp 20 generally includes a high efficiency light source, such as a light emitting diode (LED).

In one embodiment, assembly 10 does not include a releasable fastener, but is integral with the pair of eyeglasses 16, and is defined as including eyeglasses 16. Many different releasable fastener types 12 fall within the scope. For example, in one embodiment, releasable fastener 12, includes a threaded element that can be tightened to press against the bridge 14, to keep the assembly 10 securely in place. In another releasable fastener type, metal that is resiliently deformable is used, to grip the bridge 14. Further, instead of releasable fastener 12, a magnet may attach assembly 10 to a magnetic spot on eyeglasses 16. In further embodiments, assembly 10 is attached to, releasably in some embodiments, permanently in others, to some object other than a pair of eyeglasses, that is structured to be worn on at least one facial feature of a human user, an ear harness, for example or a headband.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A lighting device, for attachment to an object structured to be worn on at least one facial feature of a human user, comprising:
    (a) a releasable fastener for releasable attachment to said object;
    (b) a pole, having a first end releasably pivotably connected to said releasable fastener, and a second end, opposed to said first end, said pole including a battery;
    (c) an electric lamp, releasably pivotably connected to said second end;
    (d) a conductive assembly, electrically connected between said battery and said electric lamp, so as to power said electric lamp; and
    (e) wherein when said battery is depleted of charge, said pole can be replaced.

2. The lighting device of claim 1, wherein said electric lamp includes a high efficiency light source.

3. The lighting device of claim 2, wherein said high efficiency light source is a light emitting diode.

4. The lighting device of claim 1, further including an actuator for activating or deactivating a flow of electricity to said electric lamp.

5. The lighting device of claim 1, further including an actuator for controlling magnitude of electric current to said electric lamp.

6. The lighting device of claim 1, wherein said pole is releasably pivotably connected to said releasable fastener, by being releasably hinged to said releasable fastener.

7. The lighting device of claim 1, wherein said electric lamp is releasably pivotably connected to said pole by being releasably hinged to said pole.

8. The lighting device of claim 1, wherein said releasable fastener is a clip.

9. The lighting device of claim 1, wherein said releasable fastener is a magnet, adapted to releasably fasten to a magnetic portion of said object.

10. A method of providing light to an area in front of the eyes of a human user, comprising:
    (a) providing an object structured to be worn on at least one facial feature of a human user;
    (b) providing a light device, including:
        (i) a releasable fastener;
        (ii) a pole, having a first end releasably pivotably connected to said releasable fastener, and a second end, opposed to said first end and containing a battery set;
        (iii) an electric lamp, releasably pivotably connected to said second end; and
        (iv) a conductive assembly, electrically connected between said battery set and said electric lamp, so as to power said electric lamp;
    (c) using said releasable fastener to releasably fasten said light device to said object;
    (d) placing said object on said facial feature of said human user;
    (e) using said lamp to provide light to said area in front of the eyes of said user; and
    (f) when said battery is depleted of charge, removing said pole and installing a new pole.

11. The method of claim 10, wherein said object is a piece of eyewear.

12. The method of claim 11, wherein said piece of eyewear is a pair of eyeglasses, and wherein said light device is attached to the bridge of said pair of eyeglasses.

13. An assembly for assisting the vision of a user, comprising:
    (a) an object structured to be worn on at least one facial feature of a human user; and
    (b) a light device attached to said object, and including:
        (i) a pole, having a first end releasably pivotably connected to said object, and a second end, opposed to said first end, and containing a battery set;

(ii) an electric lamp, releasably pivotably connected to said second end; and
(iii) a conductive assembly, electrically connected between said battery set and said electric lamp, so as to power said electric lamp.

14. The assembly of claim 13, wherein said pole is pivotably connected to said pole by being pivotably connected to a releasable fastener, which is removably fastened to said object.

15. The assembly of claim 13, wherein said pole is removable and replaceable.

16. The assembly of claim 13, wherein said conductive assembly includes a wire, connecting said battery to said electric lamp.

17. The assembly of claim 13, wherein said conductive assembly includes matching contacts on said pole and said electric lamp, that stay in contact as said electric lamp is pivoted.

18. The assembly of claim 13, wherein said pole is pivotably connected to said bridge, such that it pivots along a single plane that is perpendicular to said bridge.

19. The assembly of claim 18, wherein said lamp is pivotably connected to said pole, such that it pivots in said single plane.

20. The assembly of claim 13, wherein said lamp is removably pivotably connected to said pole.

\* \* \* \* \*